UNITED STATES PATENT OFFICE
CERTIFICATE OF CORRECTION

Patent No. 3,750,080　　　　　　　　　Dated July 31, 1973

Inventor(s) PHILIPPE ROUVRE, ET. AL.

It is certified that error appears in the above-identified patent and that said Letters Patent are hereby corrected as shown below:

On the cover sheet 73 Assignee, after "Billancourt," insert -- and Automobiles Peugeot, Paris, -- .

Signed and sealed this 20th day of August 1974.

(SEAL)
Attest:

McCOY M. GIBSON, JR.　　　　　　　　　C. MARSHALL DANN
Attesting Officer　　　　　　　　　　Commissioner of Patents

PATENTED JUL 31 1973 3,750,080

WINDSCREEN WASHER AND WIPER TIMING CONTROL SWITCH HAVING A ROTATABLY MOUNTED CONTROL LEVER

The present invention relates to a combination control device for the windscreen washer and wiper systems of automotive vehicles. This device is of the timing type and permits selection of, by means of a single control lever the desired mode of operation of the windscreen wiper by adjusting at will the desired timing under intermittent operation conditions, that is, the inoperative period between two successive wiping cycles, and the actuation of the electric pump operating the windscreen washer. The windscreen washer may be designed for delivering only the volume of fluid necessary for one cleaning operation.

It is the essential object of this invention to provide switching means capable of performing the functions broadly set forth hereinabove, in a simple yet reliable manner, by producing a single rocking movement and a single rotational movement of the control lever.

The combination windscreen washer and wiper timing control switch according to this invention is characterized essentially in that it comprises a control lever adapted to control by selective rotation the windscreen wiper motor and by tilting the windscreen washer motor. A fixed case having tiltably mounted therein a body or box receives said lever which forms a rod and is adapted to rotate about its axis in said box Also provided is a pair of sliding contacts electrically interconnected and co-acting with contact studs or segments corresponding to the different rated speeds of the windscreen wiper motor in which one of said segments consists of a resistive track engaged by one of said sliding contacts to form therewith a rehostat for adjusting the switch timing.

A typical form of embodiment of a control device or switch of the type broadly described hereinabove will now be depicted by way of example with reference to the accompanying drawings.

Figure 1:
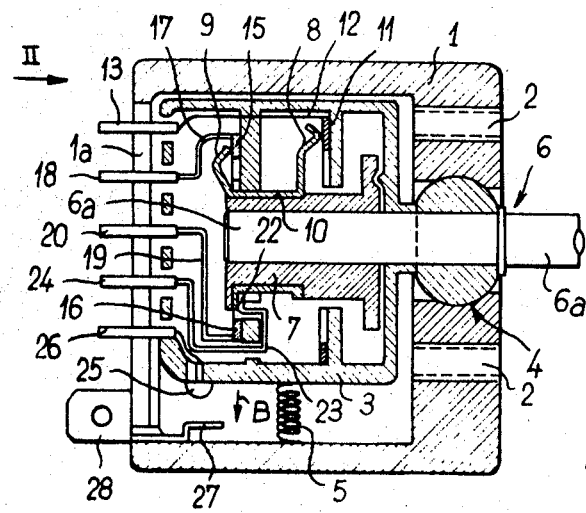
FIG. 1 is an axial sectional view of the switch taken along the axis of the control lever.
Figure 2:
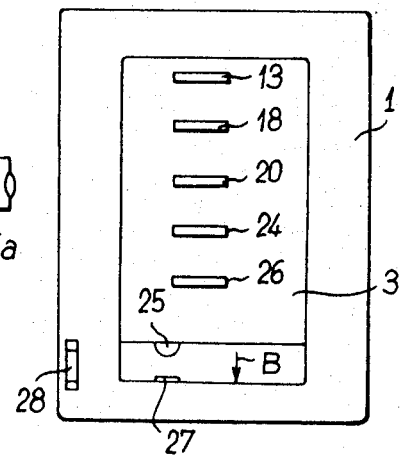
FIG. 2 is an end view taken in the direction of the arrow II of FIG. 1.
Figure 3:
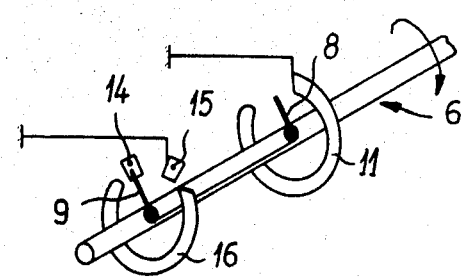

FIG. 3 is an isometric diagram showing the electrical arrangement of the inner contact system of the control device. The control device illustrated in the drawings comprises in a fixed case 1 adapted to be secured to the instrument panel or other convenient portion of the vehicle by means of screws engageable in tapped holes 2, a movable body or box 3 of insulating material, tiltably mounted in said case 1 by means of a swivel-joint device 4, so that it can be moved in the direction of the arrow B of FIGS. 1 and 2 against the force of a return spring 5 interposed between said body 3 and said case 1. Return spring 8 tends to keep the body 3 in its normal, inoperative position as shown in FIGS. 1 and 2.

A control lever 6 extends through the case 1 and swivel joint 4 in which the outer portion 6a of lever 6 constitutes the control handle for actuating the device and the inner portion 6b thereof carries an integral socket 7 of insulating material. Socket 7 is rigid with a pair of sliding contacts 8, 9 extending radially from a common conductive sleeve 10 secured to said socket 7. Sliding contact 8 co-acts with a track 11 of resistive material secured to an internal wall of the body 3, so as to constitute therewith a rheostat. The track 11 is connected via a conductor 12 to a connecting lug 13 projecting to the outside of case 1 through a corresponding aperture 1a of said case 1. The other sliding contact 9 co-acts with contact studs 14, 15 and also with a conductive segment 16 forming a part-circular element carried by the registering face of an inner partition of body 3, in the manner shown diagrammatically in FIG. 3. The first contact stud 14 corresponds to the inoperative position of the windscreen wiper motor and is connected via a conductor 17 to another connecting lug 18. The conductive segment 16 constitutes a conductice track connected via another conductor 19 to a connecting lug 20 inserted in the circuit producing the desired intermittent operation of the windscreen wiper motor.

Sleeve 10 also carries a sliding contact 22 connected via another conductor 23 to a connecting lug 24 inserted in the control circuit of the windscreen wiper motor.

Secured to the inner surface of case 1 towards which the body 3 is adapted to be tilted by actuating the control lever 6 in contact 25 electrically connected to a connecting lug 26 inserted in the control circuit of the windscreen washer pump.

The inner movable body 3 comprises an external contact 27 adapted to engage said contact 25 and connected via a conductor to a connecting lug 28 inserted in the control circuit of the windscreen washer pump.

The above-described control switch operates as follows:

By rotating the control lever 6 in the direction shown in FIG. 3 about its axis, from the inoperative position illustrated (i.e., sliding contact 9 on contact stud 14, which corresponds to the inoperative position of the windscreen wiper motor) and bringing this sliding contact 9 into engagement with the other contact stud 15, the continuous operation of the windscreen wiper motor may be obtained. Then, by causing the sliding contact 9 to engage the segment 16, the intermittent operation of the windscrren wiper motor may be obtained, since the segment 16 and resistive track 11 are inserted in series in the timing circuit, whereby the timing will vary as a function of the angular position of the lever, since the resistive track 11 acts as an adjustment rheostat.

Moreover, by moving the control lever 6 in the direction producing the movement of body 3 as shown by the arrow B, this lever will tilt with the body 3 in case 1, whereby contact 27 will engage contact 25, thus closing the control circuit of the windscreen washer pump. The control circuit will be subsequently reopened by the force of return spring 5 when the control lever 6 is released by the operator.

Of course, various modifications may be brought to the specific form of embodiment of the invention shown and described herein by way of example, as will readily occur to those conversant with the art, without departing from the basic principle of the invention as set forth in the appended claims.

What is claimed as new is:

1. A control switch for a windscreen washer, electrically connected to a washer motor, and a windscreen wiper, electrically connected to a wiper motor and operative at different rated speeds, comprising:
   a. a fixed casing;
   b. a box, mounted within the casing, which may be tilted with respect to the casing, said box having a contact stud and first and second conductive segments, in which said first segment comprises a resistive track;
c. means for closing a circuit for the electric washer; and
d. a control lever, connected within the box and rotatable about its axis, said control lever including a rod, having first and second sliding contacts, said rod being rotated to one position to connect, respectively, said first and second sliding contacts with said first and second conductive segments, said first sliding contact and said first segment forming a rheostat for electrically adjusting switch timing for the timed operation of the electric wiper, and being rotated to a second position to connect one of said sliding contacts with said contact stud for coninuous operation of the electric wiper, and said rod being tilted to operate the electric washer.

2. The control switch of claim 1 wherein said means for closing comprises:
a. a first contact fixedly mounted on said casing;
b. a second contact mounted on said box; and
c. a spring connected between said box and said casing wherein said box may be tilted against the resistance of the spring to connect said first and second contacts so as to operate the electric washer motor.

* * * * *

UNITED STATES PATENT OFFICE
CERTIFICATE OF CORRECTION

Patent No. 3,750,080          Dated July 31, 1973

Inventor(s) PHILIPPE ROUVRE, ET. AL.

It is certified that error appears in the above-identified patent and that said Letters Patent are hereby corrected as shown below:

On the cover sheet 73 Assignee, after "Billancourt," insert -- and Automobiles Peugeot, Paris, -- .

Signed and sealed this 20th day of August 1974.

(SEAL)
Attest:

McCOY M. GIBSON, JR.
Attesting Officer

C. MARSHALL DANN
Commissioner of Patents